Patented Sept. 21, 1943

2,329,798

UNITED STATES PATENT OFFICE 2,329,798

ACETATE ARTIFICIAL SILK DYESTUFFS

William Wyndham Tatum, Blackley, Manchester, England, assignor to Imperial Chemical Industries Limited, a corporation of Great Britain No Drawing. Application November 25, 1938, Serial No. 242,415. In Great Britain November 29, 1937

10 Claims. (Cl. 260—376)

This invention relates to dyestuffs and more particularly to anthraquinone dyestuffs suitable for dyeing acetate artificial silks.

This invention has as an object to provide new water-soluble anthraquinone dyestuffs. A further object is to devise a method of manufacturing new water-soluble anthraquinone dyestuffs. A further object is to devise a new method of dyeing acetate artificial silks. Further objects will appear hereinafter. These objects are accomplished by the following invention.

I have found that I can manufacture new water-soluble anthraquinone dyestuffs by interacting a beta-hydroxyethylaminoanthraquinone with the anhydride of an aromatic or aliphatic dicarboxylic acid having from 3 to 12 carbon atoms in the correct proportions for the formation of the mono-ester and then converting the mono-ester so formed into a soluble salt.

By mono-ester I mean an ester in which one of the carboxy groups of the dicarboxylic acid is unesterified.

The beta-hydroxyethylaminoanthraquinones may be substituted in the anthraquinone nucleus by chloro or bromo atoms or methyl, nitro, amino, alkylamino, arylamino, hydroxy or alkoxy groups.

In making the dyestuffs the interaction of the beta-hydroxyethylaminoanthraquinone and the anhydride may be carried out conveniently by heating them together in a liquid medium, preferably one which dissolves both reactants at the temperature of the reaction. The conversion of the resulting products to soluble salts can be carried out readily for instance by dissolving the products in alkaline solution and precipitating the resulting salts. The conversion to soluble salts can also be carried out along with the interaction of the beta-hydroxyethylaminoanthraquinone and the anhydride by adding an alkali metal carbonate. The sodium salt is the most generally convenient but other alkali metal salts, ammonium salts or other soluble salts can also be used.

The dyestuffs are dyed from their aqueous solutions, preferably by working from a bath which is worked first cold and then at about 80° C. Printing may be effected by making up a paste containing the dyestuff and a gum thickening and, if desired, printing assistants, printing the paste on the textile material, steaming and washing.

The following examples in which parts are by weight, illustrate but do not limit the invention.

Example 1

20 parts of 1-methylamino-4-beta-hydroxyethylaminoanthraquinone, 8 parts of succinic anhydride, and 45 parts of pyridine are boiled together under a reflux condenser for 2 hours. The mixture is cooled, filtered, the filter-cake washed with ethyl alcohol, then stirred into 700 parts of water and sodium carbonate added until the liquor is alkaline. The dyestuff goes into solution and the solution is heated and filtered hot to remove any insoluble matter. 70 parts of sodium chloride are added to the filtrate, and the dyesuff filtered off, pressed and dried.

The dry product is blue. It dissolves in water with a blue colour, which changes to pink when hydrochloric acid is added. It dissolves in 96% sulphuric acid with a bluish red colour, which changes to blue when formaldehyde is added. The dyestuff appears to be the sodium salt of 1 - methylamino - 4 - beta-hydroxyethylaminoanthraquinone mono-ester of succinic acid having the probable formula

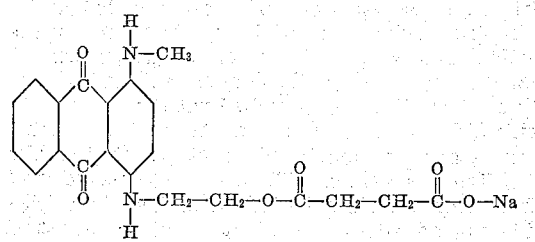

The pyridine may be replaced by nitrobenzene (80 parts) and the heating then done at 110°-120° C. If desired, the dyestuff can be obtained directly as sodium salt by carrying out the interaction in the presence of 4 parts of anhydrous sodium carbonate. The succinic anhydride may be obtained by heating succinic acid in the nitrobenzene before adding the anthraquinone derivative. On replacing the succinic anhydride by 14 parts of phthalic anhydride, there is obtained the corresponding mono-ester of phthalic acid, soluble in water with a blue colour but precipitated by hydrochloric acid. The solution in 96% sulphuric acid is almost colourless but develops a blue colour on the addition of formaldehyde. It dyes in blue shades.

Example 2

1 part of the dyestuff of the first part of Example 1 is dissolved in 5000 parts of water at 50° C. and 30 parts of sodium chloride added 100 parts of acetate artificial silk, prepared for dyeing, are put into this solution and dyeing carried out, first for half an hour during which time the temperature is raised to 80° C. and then for a further hour at 80° C. The acetate artificial silk is rinsed and dried. It is coloured a fast bright blue shade.

*Example 3*

20 parts of 1-amino-4-beta-hydroxyethylamino-2-methylanthraquinone, 11 parts of phthalic anhydride and 30 parts of pyridine are boiled under a reflux condenser for 2 hours. 50 parts of ethyl alcohol are added to the mixture and it is allowed to cool. The dyestuff is filtered off, washed with ethyl alcohol, then added to 600 parts of water and brought into solution by adding enough sodium carbonate to make the liquor alkaline. The liquor is filtered from any insoluble matter. 60 parts of sodium chloride are added to the filtrate, and the dyestuff filtered off and dried below 60° C.

The dry dyestuff is violet. It dissolves in water with a violet colour and is precipitated by either hydrochloric acid or sodium hydroxide. It dyes acetate artificial silk violet.

It is the sodium salt of 1-amino-4-beta-hydroxyethylamino-2-methylanthraquinone mono ester of phthalic acid. The ammonium and potassium salts can be made in a similar way. The sodium salt has the probable formula

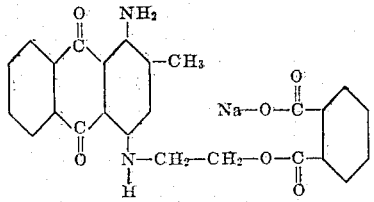

*Example 4*

20 parts of 1-anilino-4-beta-hydroxyethylamino-anthraquinone, 5.5 parts of succinic anhydride, and 45 parts of pyridine are boiled under a reflux condenser for 2 hours. The mixture is cooled, poured into 700 parts of water and 60 parts of 30% hydrochloric acid are added. The dyestuff is filtered off, washed with water, stirred with 2500 parts of water and brought into solution by adding enough sodium carbonate to make the liquor alkaline. The liquor is heated and then filtered while hot. 150 parts of sodium chloride are added to the filtrate, and the dyestuff again filtered off.

When dry, the new dyestuff is blue. It is sparingly soluble in water in which it dissolves with a blue colour. It dissolves in 96% sulphuric acid with a blue colour, which changes to green when formaldehyde is added. It dyes acetate artificial silk in fast greenish-blue shades. It has the probable formula

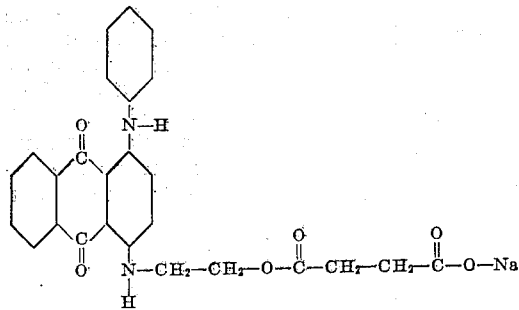

*Example 5*

9 parts of 2-chloro-1-amino-4-beta-hydroxyethylaminoanthraquinone, 2.8 parts of maleic anhydride and 23 parts of pyridine are boiled together under a reflux condenser for 2 hours. The mixture is cooled and then poured into a mixture of 1000 parts of ice and water to which have been added 36 parts of 30% hydrochloric acid. When all the ice is melted, the mixture is filtered and the crude dyestuff washed with 1% hydrochloric acid and cold water and stirred into 1000 parts of cold water. Enough sodium carbonate is added to make the liquor alkaline and the liquor is filtered from insoluble matter. 100 parts of sodium chloride are added to the filtrate, and the dyestuff filtered off.

The product dissolves in water with a reddish-blue colour and in 96% sulphuric acid to an almost colourless solution, which becomes deep reddish-blue when formaldehyde is added. It dyes acetate artificial silk in violet shades. It has the probable formula

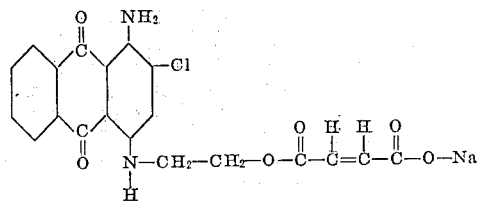

*Example 6*

15 parts of 1:4-di-(beta-hydroxyethylamino)-5:8-dihydroxyanthraquinone, 8.2 parts of maleic anhydride and 30 parts of pyridine are boiled together under a reflux condenser for 2 hours. The mixture is cooled, poured into 900 parts of ice and water containing 40 parts of 30% hydrochloric acid and filtered. The filter-cake is washed with 1% hydrochloric acid, and then with water, put into 1100 parts of water, and sodium carbonate added until the liquor is alkaline. The resulting solution is filtered to remove any insoluble matter. 55 parts of sodium chloride are added to the filtrate and the precipitated dyestuff is filtered off and dried. It dissolves in water with a greenish-blue colour and in 96% sulphuric acid with a red colour which changes to a dull green on addition of formaldehyde. It dyes acetate artificial silk greenish-blue.

*Example 7*

10 parts of 2-bromo-1-amino-4-beta-hydroxyethylaminoanthraquinone, 5 parts of phthalic anhydride and 40 parts of dry nitrobenzene are stirred together at a temperature of 110° C. for 2 hours. When cold, the product is filtered off and freed from nitrobenzene by washing with ethyl alcohol. It is then dissolved in 400 parts of water containing 3 parts of anhydrous sodium carbonate. The solution is filtered, 20 gm. of sodium chloride are added, the precipitate is filtered off and allowed to dry.

The new dyestuff which is the sodium salt of the 2-bromo-1-amino-4-beta-hydroxyethylaminoanthraquinone mono-ester of phthalic acid dissolves in water with a reddish-blue colour. It has the probable formula

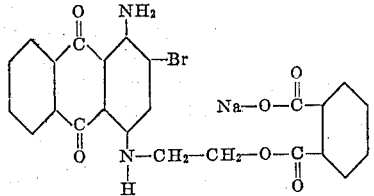

Its solution in 98% sulphuric acid is almost colourless, but becomes blue on addition of formaldehyde. It dyes acetate artificial silk a reddish-blue. Use of succinic anhydride instead of phthalic anhydride gives the corresponding succinic ester, which has similar properties.

*Example 8*

10 parts of 1-methylamino-4-beta-hydroxyethylaminoanthraquinone, 9 parts of 3:6-dichlorophthalic anhydride and 25 parts of dry pyridine are boiled together under a reflux condenser for 2 hours. The product is isolated from the pyridine by filtration or by pouring into dilute hydrochloric acid and is then dissolved in 400 parts of dilute aqueous sodium carbonate solution. The solution is filtered, the dyestuff is precipitated by addition of sodium chloride filtered off and dried.

The dry dyestuff dissolves in water with a blue colour. The solution in 98% sulphuric acid is almost colourless, but turns blue on the addition of formaldehyde. It dyes acetate artificial silk bright blue. It has the probable formula

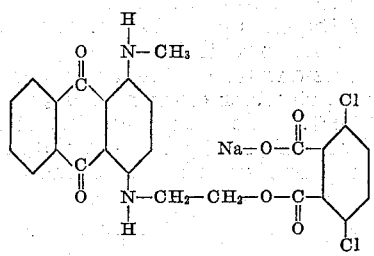

Dyestuffs of similar properties may be obtained by replacing the 3:6-dichlorophthalic anhydride by homophthalic anhydride (6.5 parts) or adipic anhydride (5.3 parts).

*Example 9*

10 parts of 1-beta-hydroxyethylaminoanthraquinone, 9 parts of phthalic anhydride and 20 parts of dry pyridine are boiled together under a reflux condenser for 2 hours. The mixture is cooled, filtered, washed with ethyl alcohol. It is dissolved in 300 parts of water containing 6 parts of anhydrous sodium carbonate. The ester crystallises out and is filtered off. The product, which is the sodium salt of 1-beta-hydroxyethylaminoanthraquinone mono-ester of phthalic acid, is filtered off and dried. The dry dyestuffs is red. It dissolves in water with a red colour and dyes acetate artificial silk in red shades. It has the probable formula

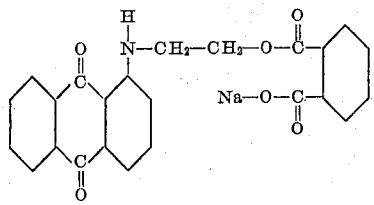

*Example 10*

15 parts of 1:4-di-(beta-hydroxyethylamino)-5:8-dihydroxyanthraquinone, 4.3 parts of succinic anhydride, and 25 parts of dry pyridine are boiled together under a reflux condenser for 2 hours. The mixture is cooled, and poured into 700 parts of ice and water containing 35 parts of 35% hydrochloric acid, filtered, and the filter cake washed with cold water, and dissolved in 700 parts of water containing about 6 parts of anhydrous sodium carbonate, filtered, to remove any insoluble matter, 60 parts of sodium chloride added and the precipitated dyestuff filtered off, washed and dried.

The dry dyestuff is blue and dissolves in water with a greenish-blue colour. It dissolves in 98% sulphuric acid with a crimson colour which changes to green on addition of formaldehyde. It dyes artificial acetate silk in fast greenish-blue shades.

*Example 11*

10 parts of 1-isopropylamino-4-beta-hydroxyethylaminoanthraquinone, 5 parts of succinic anhydride and 24 parts of dry pyridine are boiled under a reflux condenser for 2 hours. The mixture is poured onto ice and water containing 30 parts of hydrochloric acid, filtered and washed with water. It is then suspended in 500 parts of cold water and converted to the soluble sodium salt by addition of sufficient sodium carbonate to render the solution alkaline. The solution is filtered cold and about 40 parts of sodium chloride added. The precipitated dyestuff is filtered off and dried below 60° C. It consists most probably of the sodium salt of the 1-isopropylamino-4-beta-hydroxyethylaminoanthraquinone half ester of succinic acid and forms a blue powder soluble in water to give a blue solution. The solution in sulphuric acid (96%) is almost colourless, changing to blue on the addition of formaldehyde. It dyes acetate artificial silk in bright blue shades. It has the probable formula

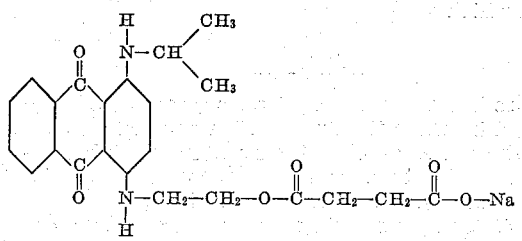

The 1-isopropylamino-4-beta-hydroxyethlaminoanthraquinone may be obtained by brominating 1-isopropylaminoanthraquinone in nitrobenzene at 25° C. and condensing the resulting 4-bromo-1-isopropylaminoanthraquinone with aminoethanol at 80° C. in nitrobenzene solution in presence of copper acetate.

In the above examples, instead of the anhydrides mentioned I could have used any anhydride of an aromatic or aliphatic dicarboxylic acid having from 3 to 12 carbon atoms such as, for instance, the anhydride of 1:2-naphthalene dicarboxylic acid.

This invention is a valuable advance in the art, giving dyestuffs which dye in bright fast shades from red to blue. The dyestuffs can also be used in printing acetate artificial silk to give similar bright fast shades.

As many apparently widely different embodiments of this invention may be made without departing from the spirit and scope thereof, it is to be understood that the invention is not limited to the specific embodiments thereof except as defined in the appended claims.

I claim:

1. The process for the manufacture of new dyestuffs which comprises interacting a beta-hydroxyethylaminoanthraquinone in which the beta-hydroxyethylamino group is in an alpha position on the anthraquinone nucleus with a compound of the class which consists of the anhydrides of the aromatic and aliphatic dicarboxylic acids which have from 3 to 12 carbon atoms in the correct proportions to form the mono-ester and then converting the mono-ester so formed into one of its water-soluble salts.

2. Process as claimed in claim 1, in which the interaction is carried out by heating the reactants together in a liquid medium.

3. A process as claimed in claim 1 in which the interaction is carried out by heating the reactants together in a liquid medium of the class which consists of nitrobenzene and pyridine.

4. A process as claimed in claim 1, in which the said conversion to a water-soluble salt comprises dissolving the mono-ester in the form of the free acid in a weakly alkaline solution and precipitating the resulting salt.

5. A process as claimed in claim 1, in which the said conversion to a water-soluble salt comprises the addition of an alkali metal carbonate to the reaction mass prior to isolation of the color.

6. A process as claimed in claim 1, in which the beta-hydroxyethylaminoanthraquinone carries in the anthraquinone nucleus at least one substituent group of the class which consists of chloro, bromo, methyl, nitro, amino, alkylamino, hydroxy and alkoxy.

7. The new water soluble amino anthraquinone compounds which carry attached to at least one amino group in an alpha position on the anthraquinone nucleus the radical

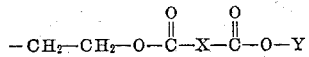

in which

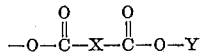

stands for a radical of an organic dicarboxylic acid in which the nucleus X of said acid contains less than 11 carbon atoms and in which Y stands for a substituent of the class consisting of alkali metals and the ammonium radical.

8. A water soluble amino anthraquinone compound which carries in the 1-position an amino radical of the class consisting of amino, arylamino and alkylamino radicals and in the 4-position an amino group of the formula

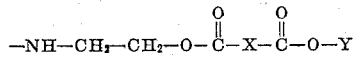

in which

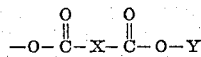

stands for a radical of an organic dicarboxylic acid in which the nucleus X of said acid contains less than 11 carbon atoms and in which Y stands for a substituent of the class consisting of alkali metals and the ammonium radical.

9. The new water soluble amino anthraquinone compounds which carry in the 1-position an amino radical of the class consisting of amino, arylamino and alkylamino radicals and in the 4-position an amino group of the formula

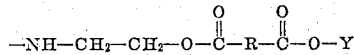

in which

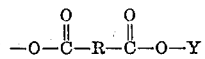

stands for a radical of an organic dicarboxylic acid in which the nucleus R of said acid is an aliphatic radical containing not more than 10 carbon atoms and in which Y stands for a substituent of the class consisting of alkali metals and the ammonium radical.

10. The new water soluble amino anthraquinone compounds which carry in the 1-position an amino radical of the class consisting of amino, arylamino and alkylamino radicals and in the 4-position an amino group of the formula

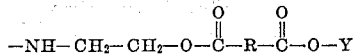

in which

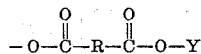

stands for a radical of an organic dicarboxylic acid in which the nucleus R of said acid is an aromatic radical containing not more than 10 carbon atoms and in which Y stands for a substituent of the class consisting of alkali metals and the ammonium radical.

WILLIAM WYNDHAM TATUM.